US007395346B2

(12) United States Patent
Pinder et al.

(10) Patent No.: US 7,395,346 B2
(45) Date of Patent: Jul. 1, 2008

(54) INFORMATION FRAME MODIFIER

(75) Inventors: Howard G. Pinder, Norcross, GA (US); Luis A. Rovira, Atlanta, GA (US); Douglas F. Woodhead, Lawrenceville, GA (US); William D. Woodward, Jr., Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 569 days.

(21) Appl. No.: 10/420,645

(22) Filed: Apr. 22, 2003

(65) Prior Publication Data

US 2004/0215807 A1  Oct. 28, 2004

(51) Int. Cl.
*G06F 15/16* (2006.01)

(52) U.S. Cl. .................. 709/232; 709/233; 709/234; 709/235; 370/230.1; 370/231; 370/232; 370/235; 704/501; 704/504

(58) Field of Classification Search ............... 703/217, 703/218, 214, 231; 370/229, 231, 236.2; 709/232–235; 704/501, 504
See application file for complete search history.

(56) References Cited

U.S. PATENT DOCUMENTS

| | | | | | |
|---|---|---|---|---|---|
| 5,822,537 | A * | 10/1998 | Katseff et al. | ............... | 709/231 |
| 5,923,814 | A * | 7/1999 | Boyce | ................. | 386/109 |
| 5,970,443 | A * | 10/1999 | Fujii | .................. | 704/222 |
| 6,014,494 | A * | 1/2000 | Minechika et al. | ............ | 386/81 |
| 6,014,694 | A * | 1/2000 | Aharoni et al. | ............. | 709/219 |
| 6,026,088 | A * | 2/2000 | Rostoker et al. | ....... | 370/395.53 |
| 6,188,670 | B1 * | 2/2001 | Lackman et al. | ............ | 370/231 |
| 6,215,766 | B1 * | 4/2001 | Ammar et al. | ............. | 370/229 |
| 6,266,817 | B1 * | 7/2001 | Chaddha | ..................... | 725/146 |
| 6,490,705 | B1 * | 12/2002 | Boyce | ................. | 714/776 |
| 6,499,060 | B1 * | 12/2002 | Wang et al. | ................. | 709/231 |
| 6,535,485 | B1 * | 3/2003 | Story | ......................... | 370/231 |
| 6,747,991 | B1 * | 6/2004 | Hemy et al. | ................. | 370/468 |
| 6,894,973 | B1 * | 5/2005 | Mishra | ....................... | 370/229 |
| 7,031,259 | B1 * | 4/2006 | Guttman et al. | ............. | 370/235 |
| 2003/0067872 | A1 * | 4/2003 | Harrell et al. | ............... | 370/229 |
| 2003/0140159 | A1 * | 7/2003 | Campbell et al. | ........... | 709/231 |
| 2004/0261113 | A1 * | 12/2004 | Paul et al. | ..................... | 725/90 |

\* cited by examiner

*Primary Examiner*—Bunjob Jaroenchonwanit
*Assistant Examiner*—Duyen M Doan

(57) ABSTRACT

A device in a subscriber television system receives a stream of frames of information, and each frame of information is carried in at least one network packet that is formatted according to a first protocol. Each network packet carries an application packet that is formatted according to a second protocol, which is a protocol for an application. The device includes application awareness that enables the device to selectively modify the application packets.

30 Claims, 9 Drawing Sheets

INFORMATION FRAME MODIFIER

FIELD OF THE INVENTION

This invention relates generally to broadband communications systems, such as subscriber television systems, and more specifically to modifying the content of selected frames of information transmitted through a portion of the subscriber television system.

BACKGROUND OF THE INVENTION

In a digital network such as a subscriber television network information is transmitted in network packets. Frequently, an apparatus in the network will receive streams of network packets from one or more sources. Problems may arise when the received streams of network packets do not come at a constant rate, or when the bit rates of the streams vary. When the apparatus receives too many network packets at one time, or when the apparatus cannot keep up with the bit rates of the received streams of network packets, the apparatus becomes congested with network packets. The latter situation may also occur when the network packets are of variable size.

When the apparatus become congested it cannot properly process the received network packets. Thus, a device and method are needed for alleviating network packet congestion.

DETAILED DESCRIPTION OF PREFERRED EMBODIMENTS

Figure 1:
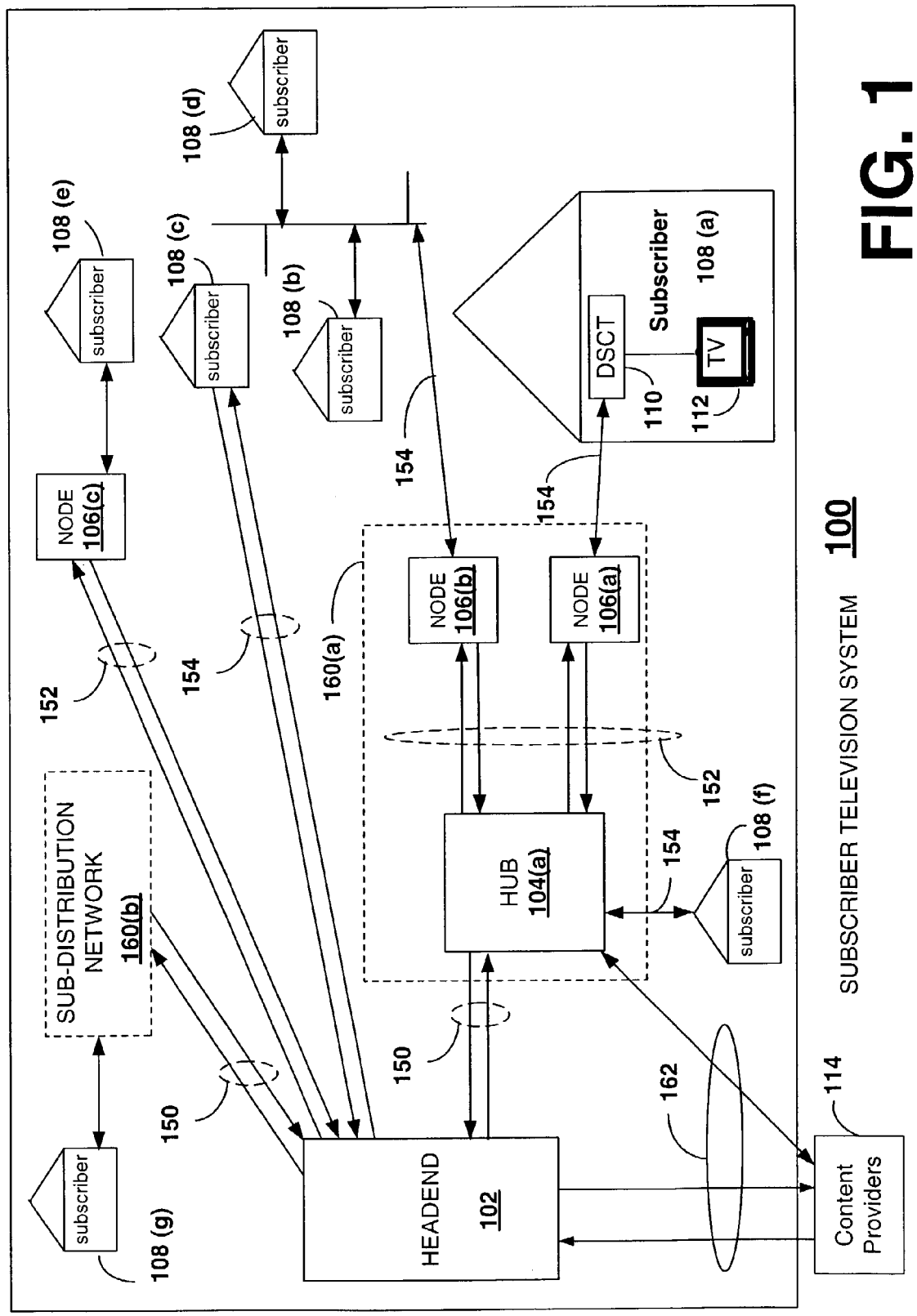
FIG. 1 is a block diagram of a broadband communications system, such as a cable television system, in which the preferred embodiment of the present invention may be employed.

Embodiments of the present invention will be described more fully hereinafter with reference to the accompanying drawings in which like numerals represent like elements throughout the several figures, and in which exemplary embodiments of the invention are shown. The present invention may, however, be embodied in many different forms and should not be construed as limited to the embodiments set forth herein. The examples set forth herein are non-limiting examples and are merely examples among other possible examples.

One way of understanding the preferred embodiments of the present invention includes viewing them within the context of a subscriber television system, which is a non-limiting example of a digital network. However, the intended scope of the present invention includes all digital networks. Frequently, in a subscriber television network, information is transmitted from one device to another device in packets, which are formatted according to application protocols such that various applications can process the content. For example, web pages are transmitted according to the Hypertext Transfer Protocol (HTTP), which enables different types of web browsers to access and display the same web pages. In one preferred embodiment of the invention, devices in the subscriber television system have application awareness, which means that the devices are adapted to utilize application protocols of various applications and modify the contents of packets in response to network conditions or modify the content of a frame of information carried by a stream of network packets. For example, a device having application awareness receives a stream of network packets that carry frames of information, and the device processes the network packets of the stream and transmits the processed network packets. In response to network congestion, the device selectively modifies the content of the processed stream of network packets to selectively modify one or more frames of information so that network congestion is partially relieved. The device uses logic related to the application of the frame of information to selectively modify the content of the stream of network packets.

In another preferred embodiment, an application aware device that receives and transmits network packets, which are associated with an application, selectively decides not to transmit certain received network packets. The device uses its application awareness to determine which of the received network packets are selected for dropping, and the device drops packets in response to network congestion.

The following disclosure explains various preferred embodiments by first describing a subscriber television system, components included in a headend of the subscriber television system, and a brief description of MPEG. The disclosure then describes a device having application awareness.

It should be understood that the logic of the preferred embodiment(s) of the present invention can be implemented in hardware, software, firmware, or a combination thereof. In one preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present invention includes embodying the functionality of the preferred embodiments of the present invention in logic embodied in hardware or software-configured mediums.

Furthermore, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, the process descriptions or blocks in flow charts should be understood as representing decisions made by a hardware structure such as a state machine known to those skilled in the art.

Television System Overview

Referring to FIG. 1, a subscriber television system (STS) 100 includes, in one example among others, a headend 102, a plurality of hubs 104, multiple nodes 106, a plurality of subscriber locations 108, and a plurality of digital subscriber communication terminals (DSCTs) 110. The headend 102 provides the interface between the STS 100 and content and service providers 114, such as broadcasters, internet service providers, and the like via communication link 162. The communication link 162 between the headend 102 and the content and service providers 114 is generally two-way, thereby allowing for interactive services such as Internet access via STS 100, video-on-demand, interactive program guides, etc. In one preferred embodiment, the hubs 104 are in direct two-way communication with the content and service providers 114 via communication link 162.

In one preferred embodiment, the headend 102 is in direct communication with the hubs 104 via communication link 150, and in direct or indirect communication with the nodes 106 and subscriber locations 108. For example, the headend 102 is in direct communication with node 106(c) via a communication link 152 and in indirect communication with nodes 106(a) and 106(b) via hub 104. Similarly, the headend 102 is in direct communication with subscriber location 108 (c) via communication link 154 and in indirect communication with subscriber location 108(a) via hub 104.

The hub 104 receives programming and other information (typically in an Ethernet format) from headend 102 via communication link 150 and transmits information and programming via communication link 152 to nodes 106, which then transmit the information to subscriber locations 108 through communication link 154. Again, whether the hub 104 communicates directly to subscriber locations 108 or to nodes 106 is matter of implementation, and in one preferred embodiment, the hub 104 is also adapted to transmit information and programming directly to subscriber locations 108 via communication link 154.

In one preferred embodiment, the communication link 150 and 152 are transmission media such as optical fibers that allow the distribution of high quality and high-speed signals, and the communication link 154 is a transmission medium such as either broadband coaxial cable or optical fiber. In alternative embodiments, the transmission media 150, 152 and 154 can incorporate one or more of a variety of media, such as optical fiber, coaxial cable, and hybrid fiber-coax (HFC), satellite, over the air optics, wireless rf, or other transmission media known to those skilled in the art. Typically, the transmission media 150, 152 and 154 are two-way communication media through which both in-band and out-of-band information are transmitted. Through the transmission media 150, 152 and 154 subscriber locations 108 are in direct or indirect two-way communication with the headend 102 and/or the hub 104.

The hub 104 functions as a mini-headend for the introduction of programming and services to sub-distribution network 160. The sub-distribution network 160(a) includes a hub 104 (a) and a plurality of nodes 106(a) and 106(b) connected to hub 104(a). Having the STS 100 divided into multiple sub-distribution networks 160 facilitates the introduction of different programming, data and services to different sub-distribution networks 160 because each hub 104 functions as a mini-headend for providing programming, data and services to DSCTs 110 within its sub-distribution network 160. For example, the subscriber location 108(b), which is connected to node 106(b), can have different services, data and programming available than the services, data and programming available to subscriber location 108(c), which is connected directly to headend 102, even though the subscriber locations 108(b) and 108(c) may be in close physical proximity to each other. Services, data and programming for subscriber location 108(b) are routed through hub 104(a) and node 106(b); and hub 104(a) can introduce services, data and programming into the STS 100 that are not available through the headend 102.

At the subscriber locations 108 a decoder or a DSCT 110 provides the two-way interface between the STS 100 and the subscriber. The DSCT 110 decodes and further process the signals for display on a display device, such as a television set (TV) 112 or a computer monitor, among other examples. Those skilled in the art will appreciate that in alternative embodiments the equipment for decoding and further processing the signal can be located in a variety of equipment, including, but not limited to, a DSCT, a computer, a TV, a monitor, or an MPEG decoder, among others.

Headend

Figure 2:
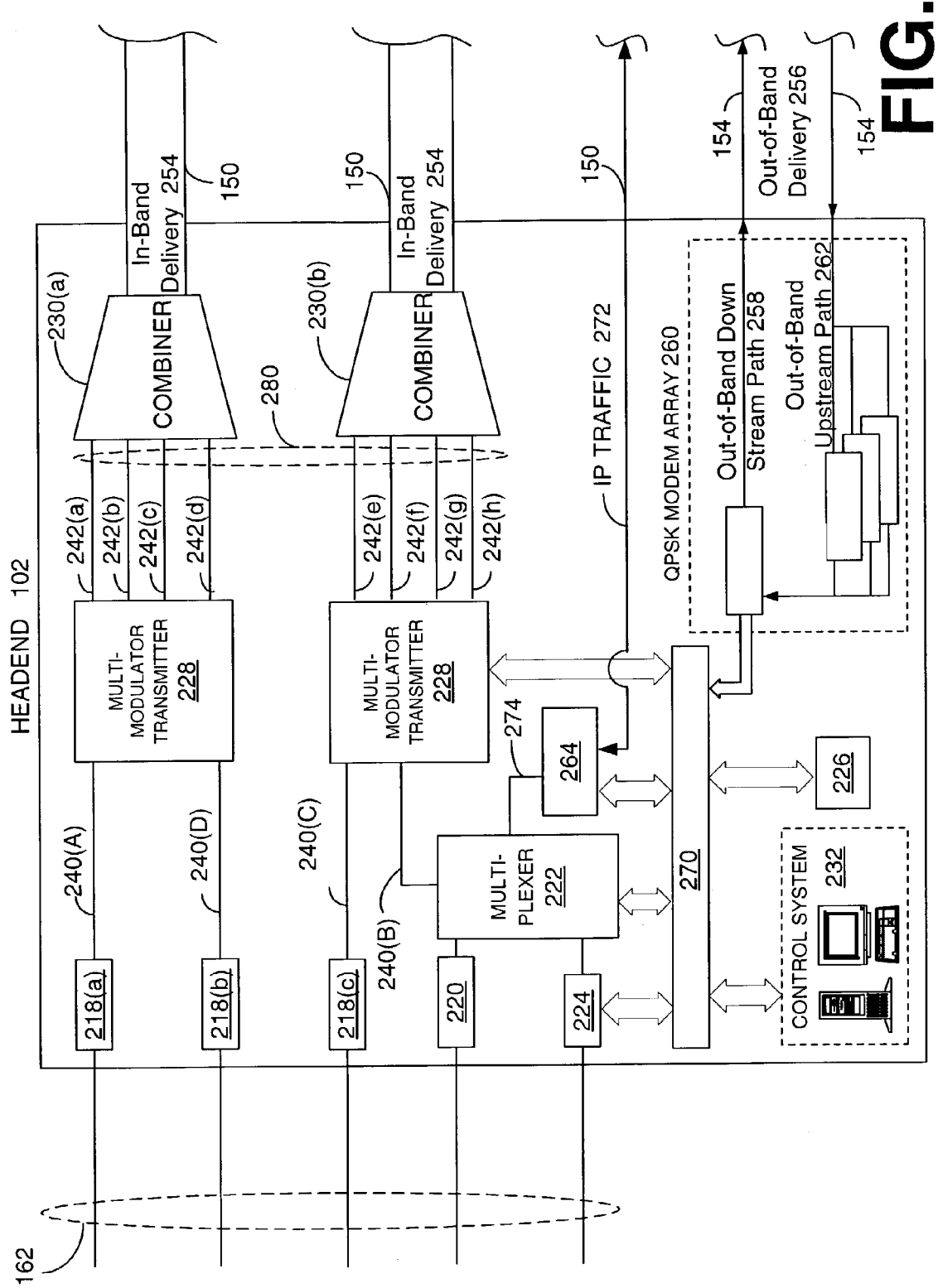
FIG. 2 is a block diagram of a headend in the broadband communication system in which the preferred embodiment of the present invention may be employed.

Referring to FIG. 2, in a typical system that includes one preferred embodiment of the invention, the headend 102 receives content from a variety of input sources, which can include, but are not limited to, a direct feed source (not shown), a video camera (not shown), an application server (not shown), and other input sources (not shown). The input signals are transmitted from the content providers 114 to the headend 102 via a variety of communication links 162, which include, but are not limited to, satellites (not shown), terrestrial broadcast transmitters (not shown) and antennas (not shown), and direct lines (not shown). The signals provided by the content providers 114 can include a single program or a multiplex that includes several programs, and typically, some of the content from the input sources is encrypted.

The headend 102 generally includes a plurality of receivers 218 that are each associated with a content source. Generally, the content is transmitted from the receivers 218 in the form of transport stream 240. MPEG encoders, such as encoder 220, are included for digitally encoding content such as local programming or a feed from a video camera. Typically, the encoder 220 produces a variable bit rate transport stream. Prior to being modulated, some of the signals may require additional processing, such as signal multiplexing, which is preformed by multiplexer 222.

A switch, such as asynchronous transfer mode (ATM) switch 224, provides an interface to an application server (not shown). There can be multiple application servers providing a variety of services such as, among others, a data service, an Internet service, a network system, or a telephone system. Service and content providers 114 (shown in FIG. 1) may download content to an application server located within the STS 100 or in communication with STS 100. The application server may be located within headend 102 or elsewhere within STS 100, such as in a hub 104.

Typically, the headend 102 includes a server such as a video-on-demand (VOD) pump 226. VOD pump 226 provides video and audio programming such as VOD pay-per-view programming to subscribers of the STS 100. In response to a user's request, the VOD pump 226 sends a stream of network packets having content for a user selected program to a router 264 via communication link 270. The router 264 then sends the received network packets to the multiplexer 222 via communication link 274, and the multiplexer 222 multiplexes the network packets into the transport stream 240b.

The various inputs into the headend 102 are then combined with the other information, which is specific to the STS 100, such as local programming and control information. The headend 102 includes multiple multi-modulator transmitters 228 that receive a plurality of transport streams 240 and transmit a plurality of modulated transport streams 242. In one preferred embodiment, each of the multi-modulator transmitters 228 includes a plurality of modulators, such as, but not limited to, Quadrature Amplitude Modulation (QAM) modulators, that convert the received transport streams 240 into modulated output signals suitable for transmission over communication link 280. It is to be understood that the type of modulation is a matter of implementation based at least in part on the communication link 280 that carries modulated transport streams 242.

In one preferred embodiment, the headend 102 includes a single multi-modulator transmitter 228, which is connected directly to VOD pump 226, and the multi-modulator transmitter 228 includes the functionality for multiplexing packets of information into transport streams and for routing packets of information.

The modulated transport streams 242 from the multi-modulator transmitters 228 are combined, using equipment such as a combiner 230, for input into the communication link 150, and the combined signals are sent via the in-band delivery path 254 to subscriber locations 108.

The transport streams 240a-240d received by the multi-modulator transmitters 228 include programs, or sessions, from different sources, which the multi-modulator transmitters 228 multiplex together to form the output transport streams 242. The multi-modulator transmitters 228 also multiplex information related to the decryption of encrypted information into output transport streams. Typically, the modulated transport streams 242 output from the multi-modulator transmitters 228 are radio frequency modulated, and each modulated transport stream 242 from one of the multi-modulator transmitters 228 is modulated to a set frequency. For the DSCT 110 (shown in FIG. 1) to receive a television program, in one preferred embodiment, among others, the DSCT 110 tunes to the frequency associated with the modulated transport stream that contains the desired information, de-multiplexes the transport stream, and decodes the appropriate program streams. The system is not limited to modulated transmission. Baseband transmission may also be used, in which case the multi-modulator 228 does not have a modulator but includes other components such as an output multiplexer and baseband electrical or optical interface.

A system controller, such as control system 232, which preferably includes computer hardware and software providing the functions discussed herein, allows the STS operator to control and monitor the functions and performance of the STS 100. The control system 232 interfaces with various components, via communication link 270, in order to monitor and/or control a variety of functions, including the channel lineup of the programming for the STS 100, billing for each subscriber, and conditional access for the content distributed to subscribers. Control system 232 provides input to the multi-modulator transmitters 228 for setting their operating parameters, such as system specific MPEG table packet organization and conditional access information.

Control information and other data or application content can be communicated to DSCTs 110 via the in-band delivery path 254 or to DSCTs 110 connected to the headend 102 via an out-of-band delivery path 256 of communication link 154. Data is transmitted via the out-of-band downstream path 258 of communication link 154 by means such as, but not limited to, a Quadrature Phase-Shift Keying (QPSK) modem array 260, or an array of data-over-cable service interface specification (DOCSIS) modems, or other means known to those skilled in the art.

Out-of-band delivery path 256 of communication link 154 also includes upstream path 262 for two-way communication between the headend 102 and the DSCTs 110. DSCTs 110 transmit out-of-band data through the communication link 154, and the out-of-band data is received in headend 102 via out-of-band upstream paths 262. The out-of-band data is routed through the router 264 to an application server or to the VOD pump 226 or to control system 232. Out-of-band data includes, among other things, control information such as a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 260 is also coupled to communication link 152 (FIG. 1) for two-way communication with the DSCTs 110 coupled to nodes 106.

Among other things, the router 264 is used for communicating with the hub 104 through communication link 150. Typically, command and control information, among other information, between the headend 102 and the hub 104 are communicated through communication link 150 using a protocol such as, but not limited to, Internet Protocol. The IP traffic 272 between the headend 102 and hub 104 can include information to and from DSCTs 110 connected to hub 104.

The control system 232, such as Scientific-Atlanta's Digital Network Control System (DNCS), as one acceptable example among others, also monitors, controls, and coordinates all communications in the subscriber television system, including video, audio, and data. The control system 232 can be located at headend 102 or remotely.

In one preferred embodiment, the multi-modulator transmitters 228 are adapted to encrypt content prior to modulating and transmitting the content. Typically, the content is encrypted using a cryptographic algorithm such as the Data Encryption Standard (DES) or triple DES (3DES), Digital Video Broadcasting (DVB) Common Scrambling or other cryptographic algorithms or techniques known to those skilled in the art. The multi-modulator transmitters 228 receive instructions from the control system 232 regarding the processing of programs included in the input transport streams 240. Sometimes the input transport streams 240 include programs that are not transmitted downstream, and in that case, the control system 232 instructs the multi-modulator transmitters 228 to filter out those programs. Based upon the instructions received from the control system 232, the multi-modulator transmitters 228 encrypt some or all of the programs included in the input transport streams 240 and includes the encrypted programs in the output transport streams 242. Some of the programs included in input transport stream 240 do not need to be encrypted, and in that case the control system 232 instructs the multi-modulator transmitters 228 to transmit those programs without encryption. The multi-modulator transmitters 228 send the DSCTs 110 the keys that are needed to decrypt encrypted programs. It is to be understood that for the purposes of this disclosure a "program" extends beyond a conventional television program and that it includes video, audio, video-audio programming and other forms of services and service instances and digitized content. "Entitled" DSCTs 110 are allowed to use the keys to decrypt encrypted content, details of which are provided hereinbelow.

In one preferred embodiment, the hub 104, which functions as a mini-headend, includes many or all of the same components as the headend 102. The hub 104 is adapted to receive the transport-streams 242 included in the in-band path 254 and redistribute the content therein throughout its sub-distribution network 160. The hub 104 includes a QPSK modem array (not shown) that is coupled to communication links 152 and 154 for two-way communication with DSCTs 110 that are coupled to its sub-distribution network 160. Thus, the hub 104 is adapted to communicate with the DSCTs 110 that are within its sub-distribution network 160, with the headend 102, and with the content providers 114. In one preferred embodiment, the hub 104 is adapted to communicate with the DSCTs 110 that are within its sub-distribution network 160 and with the headend 102. Communication between the hub 104 and content providers 114 is transmitted through the headend 102.

Network Architecture

The components of the headend 102 communicate using a communication architecture such as open systems interconnection (OSI) or transmission control protocol/internet protocol (TCP/IP). TCP/IP and OSI are well-known in the art and shall not be described in detail. However, a brief discussion of the TCP/IP architecture is provided hereinbelow.

Figure 3:
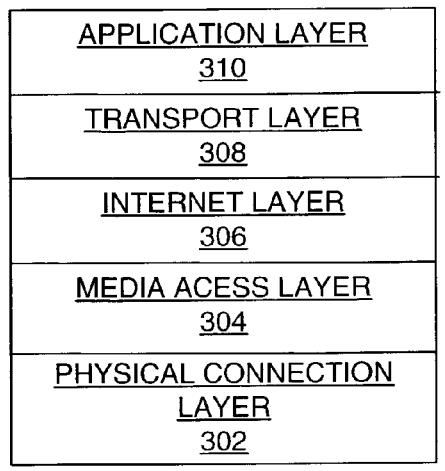
FIG. 3 is a block diagram of TCP/IP network architecture.

Referring to FIG. 3, TCP/IP network architecture five layers: a physical connection layer 302, a media access layer 304, an internetwork layer 306, a transport layer 308 and an application layer 310.

The first layer, or physical layer 302, governs the electrical or optical interface to the wire, fiber or other medium as well as coding or modulation specific to the media.

The second layer, or media access layer, 304 regulates how, who and when hosts may transmit on the physical medium as well as for which hosts the messages are bound.

The third layer is the network layer 306, which defines an official packet format and protocol called internet protocol (IP). The network layer 306 is responsible for delivering packets to their correct destination.

The fourth layer is the transport layer 308. There are two protocols used by the transport layer 308, the transport control protocol (TCP) and the user datagram protocol (UDP). TCP is a connection oriented protocol that ensures an order of delivery for the data that the TCP layer presents to higher level protocols. UDP is a connectionless datagram protocol that does not guarantee delivery of information, but UDP is useful for many simple communications that do not need the overhead of TCP.

The final layer, the application layer 310 contains many commonly used functions for distributed applications. Examples of application layer protocols from the TCP/IP protocol suite include telnet, the file transfer protocol (FTP) and the hypertext transfer protocol (HTTP) that is used for retrieving web pages.

Moving Pictures Expert Group (MPEG)

Although the present invention is described in terms of an MPEG application, this is for exemplary purposes only and is intended to be a non-limiting example. Other applications such as, but not limited to, HTML, non-MPEG streaming media codecs, single or multiplayer games, virtual reality communities.

The Moving Pictures Experts Group (MPEG) was established by the International Standards Organization (ISO) for the purpose of creating standards for digital audio/video compression. MPEG as referenced in this application is described in the MPEG-1, MPEG-2 and MPEG-4 standards. The MPEG-1 standards (ISO/IEC 11172), the MPEG-2 standards (ISO/IEC 13818) and the MPEG-4 standards (ISO/IEC 14496) are described in detail in the International Organization for Standardization document ISO/IEC JTC1/SC29/WG11 N (June 1996 for MPEG-1, July 1996 for MPEG-2, and October 1998 for MPEG-4), which is hereby incorporated by reference.

An MPEG encoder such as encoder 220, receives content such as video and audio signals and converts the content into digitized streams of content known as elementary streams. The encoder produces separate elementary streams for the video content and the audio content. In many instances, an MPEG program, such as a movie, includes a video elementary stream, audio elementary streams in multiple different languages, and associated elementary streams, which include things such as the director's comments, out takes, etc. or whatever the producer or distributor or others desire to associate with the movie.

Figure 4:
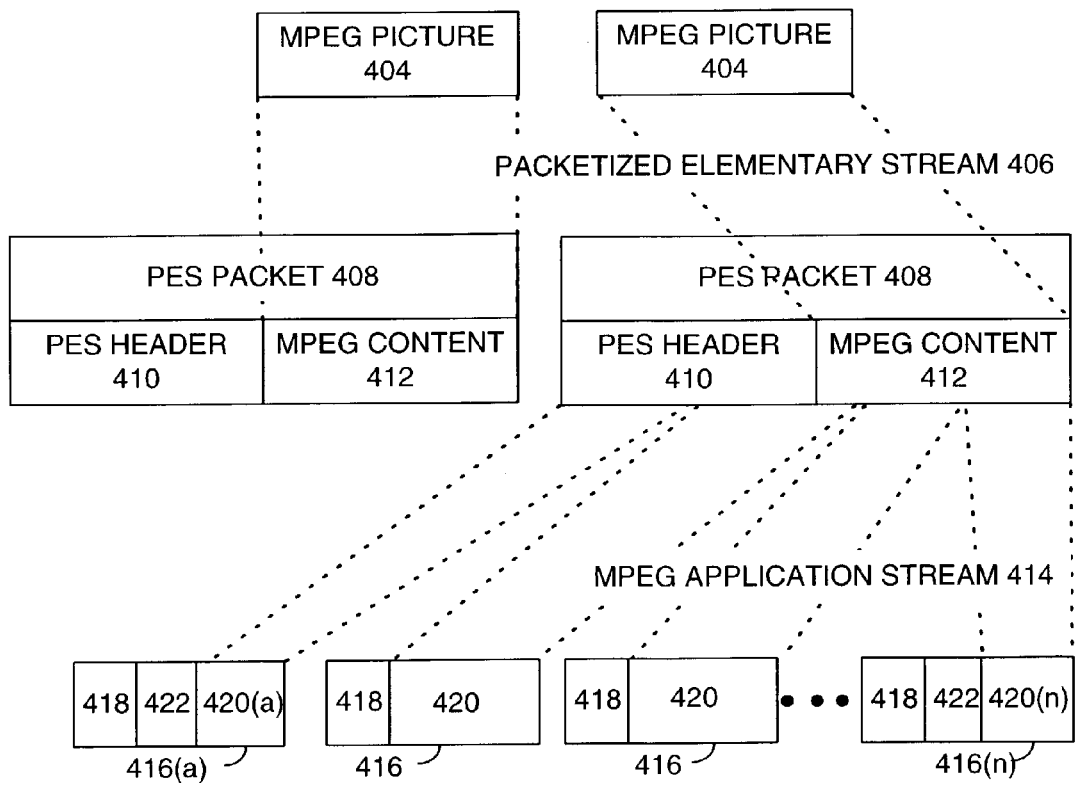
FIG. 4 is a block diagram of the mapping of an MPEG elementary stream into an MPEG application stream.

In FIG. 4 the relationship between a video elementary stream and packets that carry the elementary stream to the user is shown. Those skilled in the art will recognize that other elementary streams such as audio elementary streams have similar relationships. For a video elementary stream, the elementary stream 402 is made up of a stream of MPEG pictures 404. Each MPEG picture 404 corresponds to a picture on a television screen in which each pixel of the television screen has been painted, and an audio elementary stream (not shown) is made up of multiple audio frames that are synchronized with the MPEG pictures. The MPEG picture 404 is an example of a frame of information, and for the purposes of this disclosure, a frame of information is defined as a segment of information having a predefined format.

Each elementary stream 402, which is a stream of frames of information, is then converted into a packetized elementary stream (PES) 406, which is made up of PES packets 408. Each PES packet 408 includes a PES header 410 and MPEG content 412. The PES header 410 includes information such as time stamps that are used for synchronizing the various elementary streams 402. The MPEG content 412 includes information from the MPEG picture 404. Generally, an MPEG picture 404 is mapped into one PES packet 408, with the MPEG content 412 corresponding to the MPEG picture 404. Because the MPEG picture 404 is of variable bit size, the bit size of the PES packet 408 is also variable. The packetized elementary stream 406 is then mapped into the MPEG application stream 414, which is made up of MPEG application packets 416. MPEG application packets 416 are of fixed size, 188 bytes, and include a header 418, which is always 4 bytes in size, a payload 420 and an optional adaptation field 422. The PES packet 408 is mapped into multiple MPEG application packets 416 such that the first byte of the PES header 410 is the first byte of the payload 420($a$) and the last byte of the MPEG content 412 is mapped into the last byte of the payload 420($n$).

The adaptation field 422 is an expandable field that is, used for, among other things, including system time reference markers such as a Program Clock Reference (PCR) field and other information that is specific to the STS 100. In addition, the adaptation field 422 is used to ensure that the bit size of an MPEG packet 416 is 188 bytes. For example, the adaptation field 422 of MPEG application packet 416($n$) is expanded to a particular size so that the last byte of MPEG content 412 is the last byte of payload 420($n$).

Typically, the payload 420 of an MPEG packet 416 can be considered to include application content and media content.

Application content includes general header information such as the PES header 410 and other application information, such as content type (video, audio, etc.), the type of compression algorithm used, and other application information. The media content includes data that was encoded into MPEG format such as audio information or a video image.

The header 418 includes a field that is 13 bits in size that is known as a Packet Identifier (PID), which is used to identify the packet as being a packet of a particular elementary stream. For example, all of the packets that carry video information of a program have the same PID value. The header 418 also includes a field that is 4 bits in size that is known as a continuity counter. Typically, the counter is incremented for each MPEG packet 416 with the same PID when the packet 416 includes a payload 420. In other words, if the packet 416 consists of a 4 byte header 418 and an 184 byte adaptation field 422, then the continuity counter is not increments for that packet. In addition, in some systems redundant packets, i.e., a packet having the same payload 420 as a previously transmitted packet 416, are transmitted, and typically, the continuity counter of the redundant counter is not incremented so that the continuity counter of the redundant packet matches the continuity counter of the previously transmitted packet.

MPEG Pictures

Figure 5:
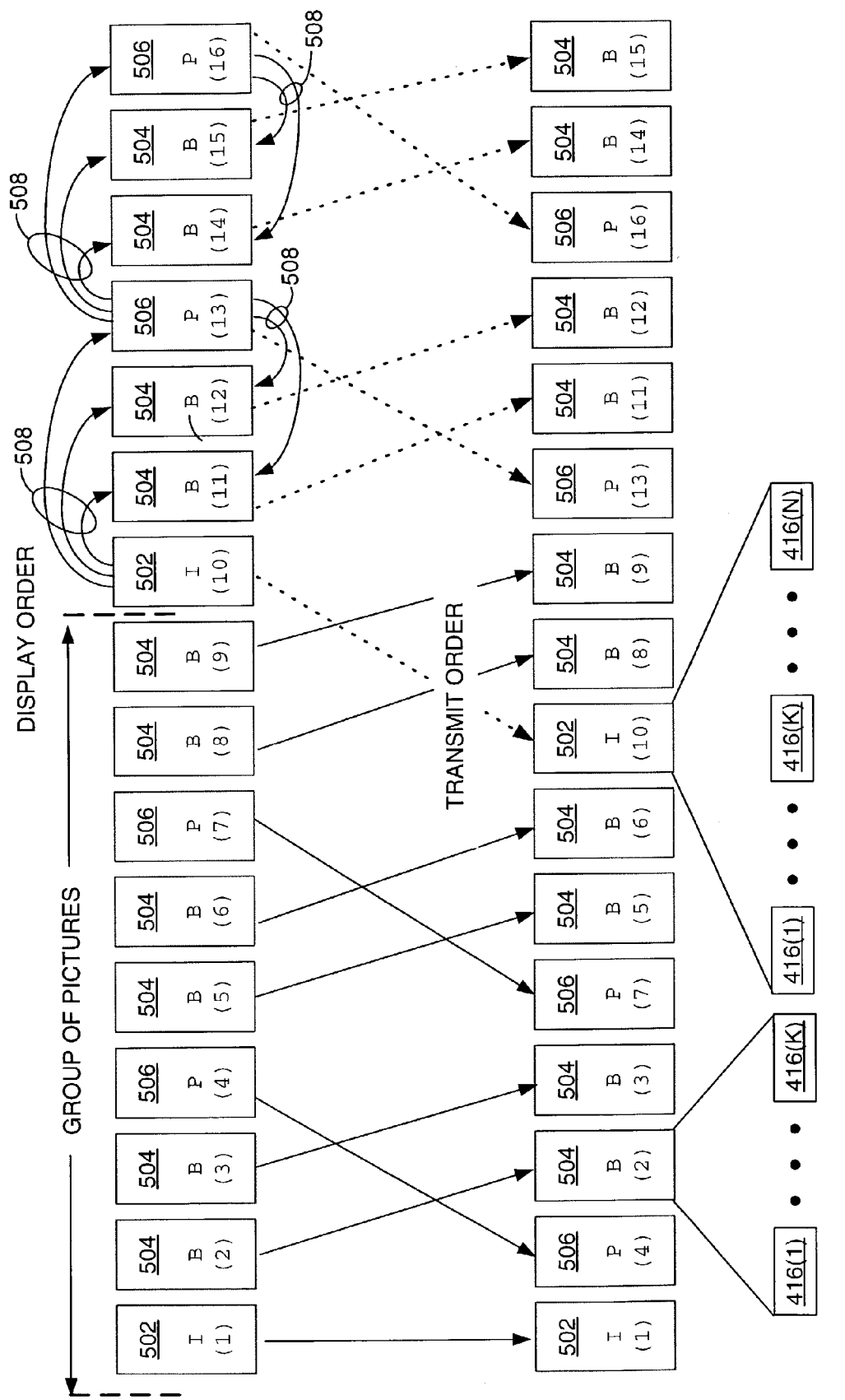
FIG. 5 is a block diagram of a sequence of MPEG pictures in both display and transmit order.

In FIG. 5 an exemplary display order and the corresponding transmit order for a sequence of MPEG pictures (frames of video information) are shown. There are three types of MPEG pictures, I-pictures 502, B-pictures 504 and P-pictures 506. I-pictures 502 are intra-coded pictures that are encoded so that they can be decoded by an MPEG decoder without knowing anything about other pictures. In general, for a given level of video quality, I-pictures 502 require more bits to encode than B-pictures or P-pictures, because all of the information for the picture is explicitly encoded in the I-picture 502.

Typically, only a portion of a picture changes between a reference picture and a subsequent picture. Instead of the transmitting the entire subsequent picture, bandwidth is saved by both compressing encoded information for the changed portion of the subsequent picture and by sending MPEG instructions that tell a decoder how to use the reference picture to generate the unchanged portions of the subsequent picture. MPEG instructions include motion vectors and the like that the decoder uses to map blocks of information from the reference picture into the subsequent picture. For example, P-pictures 506 are predictive coded pictures, which are decoded using information from a reference picture, which is either an I-picture 502 or a previous P-picture 506. Information that cannot be determined from a reference picture is encoded in the P-picture 506. Typically, the bit size for a P-picture 506 is smaller than an I-picture 502 because the P-picture 506 includes less encoded picture data.

The B-pictures 504 are bi-directionally coded pictures, which use information from a previous reference picture (an I-picture 502 or a P-picture 506) and/or a subsequent picture, which is either an I-picture 502 or a P-picture 504. The arrows 508 represent the directional coding between the I-pictures 502, the B-pictures 504, and the P-pictures 506.

In FIG. 5 the first 16 pictures of an MPEG video stream are shown. The $1^{st}$ and $10^{th}$ pictures are I-pictures 502. The pictures are transmitted in an order different from their display order. B-pictures 504 are transmitted after both their prior and subsequent reference pictures have been transmitted. For example, the $11^{th}$ picture uses information from the $10^{th}$ and $13^{th}$ pictures, and therefore, it is transmitted after both the $10^{th}$ and $13^{th}$ pictures have been transmitted. Because the B-pictures 504/P-pictures 506 are transmitted after their respective reference pictures, an MPEG decoder will have all of the necessary information to generate a picture when the B-picture/P-picture arrives.

Within the MPEG video syntax, a group of pictures (GOP) can be defined. However, in the context of this disclosure a GOP is defined as being an I-picture 502 and all of the P-pictures 506 and B-pictures 504 between that I-picture 502 and the next subsequent I-picture 502, when the pictures are arranged in display order. There is no set number of pictures for a GOP. A GOP could consist of one I-picture 502 or any other number of pictures. However, there are practical considerations for determining the number of pictures in a GOP, such as, bandwidth and picture acquisition time. Because I-pictures 502 are the largest pictures, the bandwidth for a video MPEG stream can be reduced by increasing the number of B-pictures 504 and P-pictures 506 in a GOP. However, the larger the GOP, the longer the picture acquisition time, which is the time necessary for a decoder to acquire all of the information to generate a complete picture. Only I-pictures 502 have all the information for a complete picture. So, if a user tunes into an MPEG video stream in the middle of a GOP, the picture will be acquired in stages as subsequent P-pictures 506, which include encoded picture information that is not predicted from the I-picture 502, are displayed. In addition to having no fixed number of pictures, GOPs can end with a B-picture 504 or a P-picture 506. When the last picture in a GOP is a P-picture 506, then the last P-picture 506 in the GOP is transmitted before the next I-picture 502. For example, if the pictures 7, 8, 9 and 10 were P-picture 506, B-picture 504, P-picture 506, and I-picture 502, respectively, then, the transmission order would be 7, 9, 8 and 10.

It should be remembered that when the MPEG pictures are transmitted to the DSCT 110, each MPEG picture is carried in a string of MPEG application packets 416, and each picture can be variable size. The size of a picture is determined in part by the compression scheme implemented, the content of the picture, and whether it is an I-picture 502, a B-picture 504, or a P-picture 506. Because the pictures are transmitted in fixed sized MPEG application packets 416, more MPEG packets 416 are usually required to carry an I-picture 502 than a B-picture 504.

Network Packet Congestion

Devices such as router 264 (see FIG. 2) receive steams of network packets from one or more sources. For example, the router 264 receives a network packets from the VOD pump 226 and the system controller 232. The network packets from the system controller 232 can be for other devices in the headend 102 or for devices in hub 104 or for a DSCT 110 or for the router 264, among others. Typically, the system controller 232 sends the router 264 information such as program priority tables and processing instructions that the router 264 uses for processing the received network packets.

Figure 6:
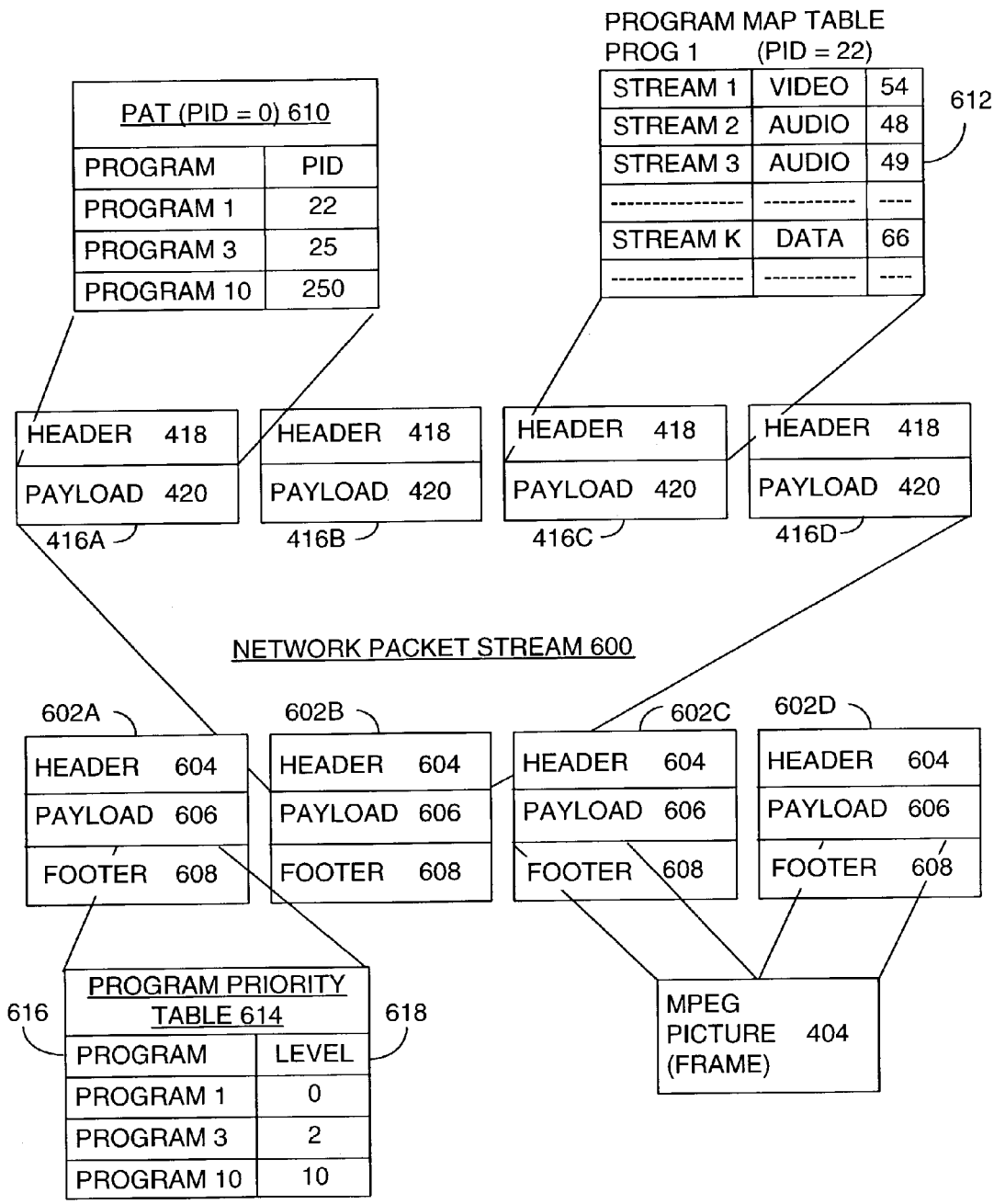
FIG. 6 is a block diagram of a network packet stream, and an exploded view of content carried in the stream.

Referring to FIG. 6, a network packet stream 600 is made up of multiple network packets 602, which are typically sequentially received by router 264. The network packets 602 of network packet steam 600 include a multiplex of network packets from different devices. For example, the network packet 602A is from the system controller 232 and includes a program priority table 614. The router 264 uses the program priority table 614 to process the received network packets 602.

The program priority table 614 associates a program 616, which is identified by a program number, with a priority level 618. The operator of the STS 100 determines a range of values and assigned each program in the STS 100 a priority level based upon that range of values. For example, a program having a priority level of 10 has the highest priority level and a program having the priority level of 0 has the lowest priority level. In one embodiment, each program carried in the network stream 600 is associated with a unique number such as, but not limited to, a logical port number, and the priority table 614 maps the unique number associated with a program to the priority level 618.

In one preferred embodiment, the network packet stream 600 is a variable bit rate stream, and sometimes the network packet stream 600 carries more bits than the router 264 can handle. The router 264 uses the program priority table 614 to selectively modify frames of information so as to reduce the number of bits that the router 264 needs to transmit. Specifically, the router 264 will first start modifying frames of information of programs having the lowest priority level 618 such as program 1, and then if necessary, it will start modifying frames of information for programs having higher priority levels such as program 3.

A network packet 602 includes a header 604, a payload 606 and a footer 608. Typically, the packet header 604 includes, among other things, address information that identifies the sender and recipient of the packet 602. The header 604 can also include information such as a logical port and the size of the payload 606. For the purposes of this disclosure, the header 604 includes all of the bits from the start of the network packet 602 to the payload 604 and can include multiple segments of bits formatted according to different transmission protocols. In a non-limiting example, the network packet 602 is an Ethernet packet carrying an IP packet carrying an application payload, and in that case, the header 604 includes header information of the Ethernet packet and the IP packet. Those skilled in the art will recognize other embodiments, which are intended to be within the scope of the invention, for carrying an application packet in a network packet.

Typically, the payload 606 includes content that has been formatted according to an application protocol such as, but not limited to, MPEG, but the payload 606 can also be the content of a service message such as table 614. Although the payload 606 of network packet 602B is shown as 4 MPEG application packets 416, this is for illustrative purposes only and is a non-limiting example. In other embodiments, the payload 606 can include a different number of MPEG application packets 416 and/or content that is formatted according to a different type of application layer protocol, such as, in a non-limiting example, HTTP, non-MPEG streaming media codecs, single or multiplayer games, and virtual reality communities.

The footer 608 is appended to the payload 606, and it includes a CRC field, which is a 4-byte value associated with the packet 602. The source device, the device that generated the network packet 602 performs a computation on the payload 606 to produce the 4-byte value, and the destination device performs the same calculation on the payload 606 when the destination device receives the network packet 602. If the value produced by the destination device is the same as the value in the CRC field of the footer 608, then the network packet 602 is determined to be uncorrupted.

The network transport stream 600 frequently includes a multiplex of MPEG programs and associated system information from the VOD pump 226. Associated system information includes, but is not limited to, a Program Association Table (PAT) 610 and a Program Map Table (PMT) 612. The PAT 610 is carried in MPEG packets having a PID value of zero. The PAT 610 associates the MPEG programs transmitted from the VOD pump 226 with their respective Program Map Table 612 using the PID value of the PMTs. For example, the PMT for program 1 has a PID value of 22.

A PMT 612 maps the elementary streams of a program to their respective PID streams, i.e., the stream of MPEG packets having a common PID value that carry the elementary stream. For example, for program 1 the video stream is carried in MPEG application packets having a PID value of 54, and the PID value for the second stream is 48.

Figure 7A:
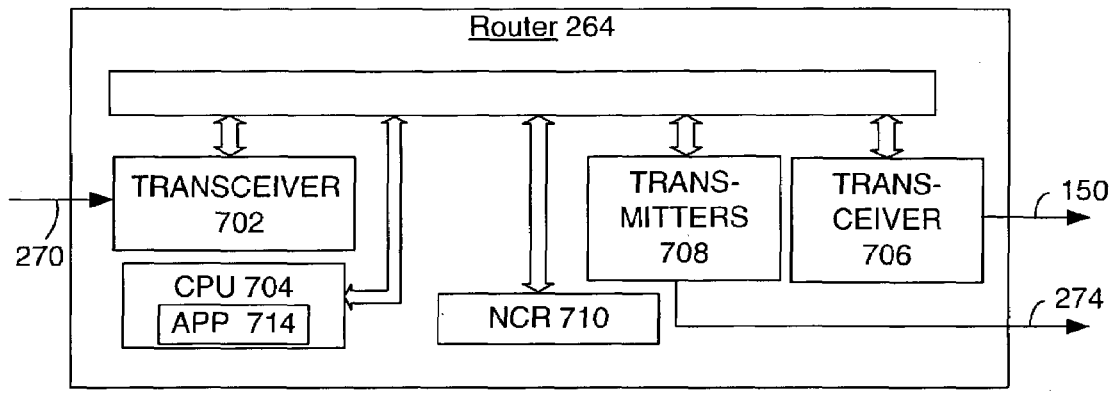
FIG. 7A is a block diagram of a router.

Referring to FIG. 7A, the router 264 includes a transceiver 702 and a transceiver 706, a CPU 704, a network congestion reliever (NCR) 710, and a partiality of transmitters 708. The transceiver 702, which is coupled to communication link 270, receives network packet streams 600 and is also adapted to transmit network packets 602 to other components of the headend 102. The transceiver 706 receives and transmits network packet 602 from and to components of the hub 104. The transceivers 702 and 706 pass received network packets 602 to the CPU 704 for processing.

The CPU 704 parses network packets 602 that are addressed to the router 264 from the received streams of network packets and uses the information such as the program priority table 614 for processing the remaining network packets. The CPU 704 includes application awareness logic 714 that the CPU 704 uses, for among other things, processing received network packets. In one preferred embodiment, the CPU 704 uses the application awareness logic 714 to determine the type of application associated with the content of a network packet received via communication link 270 and is adapted to read at least a portion of the content. In one non-limiting example, the application awareness logic 714 enables the CPU 704 to read the content of a network packet and determine whether the content includes audio, video, or some other type of MPEG content, and determine whether the packet is the first packet of a set of packets that carry a frame of information, such as an MPEG picture, and if so, identify the type of picture. In one preferred embodiment, the CPU 704 uses the PAT 610 to identify the PMTs 612 carried by the received network transport streams 600. Using the PMT 612 of a particular program, the CPU 704 then identifies the elementary streams of the particular program by their respective PID values.

Figure 8:
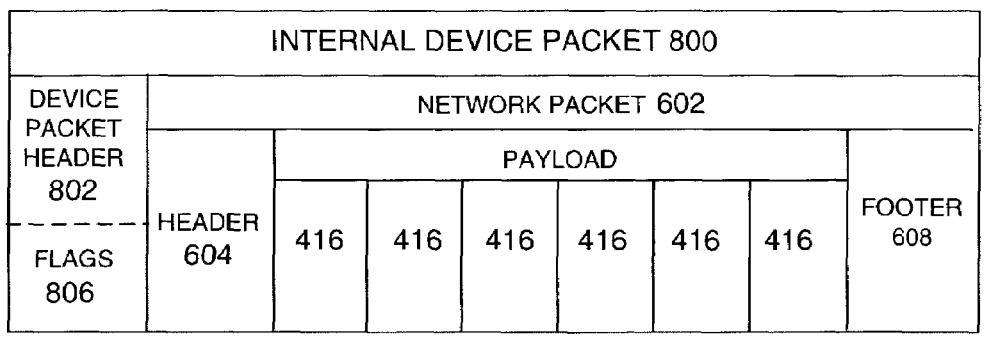
FIG. 8 is a block diagram of an internal device packet.

The CPU 704 is also adapted to convert a received network packet 602 into an internal device packet (IDEP) 800, which is shown in FIG. 8. The IDEP 800 includes a device packet header 802 and flags 806, which are prepended to the network packet 602. The CPU 704 uses application awareness logic 714 and processing information such as program priority tables 614 to set the flags 806. For example, the CPU 704 uses the application awareness logic 714 to check the application packets 416 of the network packet 602 to determine the type of content included therein. The application awareness logic 714 can determine whether the content is a portion of an I-picture 502, a B-picture 504, or a P-picture 506, it can also determine whether it is the first packet of a picture, whether it is the first packet of an audio frame, etc. and sets the processing flags 806 accordingly. Included in the processing flags 806 are flags set in accordance with the program priority table 614. In addition, the CPU 704 uses system information received from control system 232 and address information from the header 604 to associate an IDEP 800 with a transmitter 708.

In one preferred embodiment, the CPU 704 reads the network packet headers 604 and determines a logical port associated with the network packet. The CPU 704 then consults the program priority table 614, which in this embodiment associates a logical port number with a priority level, and then sets flags 806 accordingly. The CPU 704 also determines whether each network packet is a portion of a program or whether its payload 606 contains other information and sets flags 806 accordingly.

Each of the transmitters 708 is coupled to the communication link 274, and in one preferred embodiment, the router 264 transmits packets to the multiplexer 222 using the UDP protocol. In this embodiment, each transmitter 708 is in communication with a particular logical port of the multiplexer 222, and each received network packet stream 600 is associated with at least one transmitter 708. Typically, a transmitter 708 is concurrently associated with multiple network packet streams 600, and there are times when the router 264 receives more network packets 602 for a given transmitter 708 than the given transmitter 708 can transmit. When that occurs, the NCR 710 manipulates selected packets to reduce the network congestion.

Figure 7B:
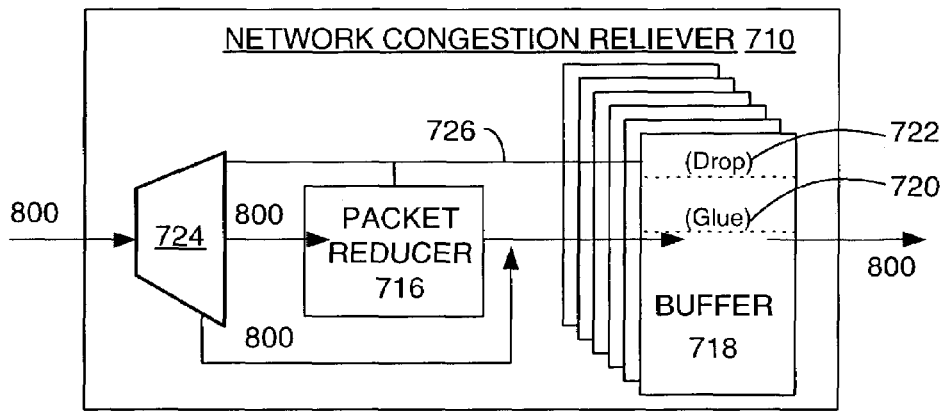
FIG. 7B is a block diagram of a network congestion reliever.

Referring to FIG. 7B, the NCR 710 includes a demultiplexer 724, a packet reducer 716, and a plurality of buffers 718. Each one of the buffers 718 is a first-in-first-out (FIFO) buffer and is associated with one of the transmitters 708. The lines with arrowheads in FIG. 7B represent the paths of IDEPs 800 in the NCR 710. The demultiplexer 724, and packet reducer 716 are in communication with the buffers 718 via a communication link 726. Each of the buffers 718 has a glue threshold 720 and drop threshold 722, which are predetermined levels of the buffer. For the purposes of this disclosure, a buffer level refers to the amount of information, i.e., the number of bits, that are currently stored in the buffer.

When the buffer level of one of the buffers 718 exceeds or drops beneath a threshold, either the glue threshold 720 or the drop threshold 722, the change is communicated to the demultiplexer 720 and the packet reducer 716 via the communication link 726. When the buffer level is beneath the glue threshold 720 for a given buffer, then that given buffer can receive and buffer IDEPs 800 without overflowing i.e., exceeding its capacity to store bits of information.

The demultiplexer 724 receives IDEPs 800 from the CPU 704 and uses the flags 806 of the IDEPs 800 to process the IDEPs 800. The flags 806 of the IDEP 800 indicate, among other things, which buffer the IDEP 800 should be buffered in and the program priority level of the IDEP. In one preferred embodiment, all IDEPs 800 that indicate a program priority level beneath a given threshold are sent to the packet reducer 716, and all other IDEPs 800 are sent to their respective buffers 718. For example, the priority level 618 for program 1 is zero, and in this embodiment, all IDEPs 800 that carry a portion of program 1 are set to the packet reducer 716.

In another preferred embodiment, the demultiplexer 724 sends all IDEPs 800 for a given buffer to the given buffer unless the buffer level for the given buffer exceeds the glue threshold 720 or the drop threshold 722 for the given buffer. If the buffer level for the given buffer exceeds the glue threshold 720 or the drop threshold 722, then IDEPs 800 for the given buffer having a priority level beneath a predetermined value are sent to the packet reducer 716 and all remaining IDEPs 800 are sent to the given buffer. For example, when the buffer level of a given buffer exceeds the glue threshold 720, all IDEPs 800 associated with that given buffer having a priority level 618 of 2 or less are sent to the packet reducer 716 and IDEPs 800 that are associated with the given buffer having a priority level 618 greater than 2 are sent to the given buffer.

In one preferred embodiment, the cut off value of the priority level 618 for sending IDEPs 800 to the packet reducer 716 changes in response to the buffer level. For example, when the buffer level for a given buffer is beneath the glue threshold 720, then the multiplexer 724 sends all IDEPs for the given buffer to the given buffer. But, when the buffer level for the given buffer is between the glue threshold 720 and the drop threshold 722, then the multiplexer 724 sends all IDEPs 800 for the given buffer having a priority level beneath a first predetermined value to packet reducer 716, and when the buffer level for the given buffer is greater than the drop threshold 722, then the multiplexer 724 sends all IDEPs 800 for the given buffer having a priority level beneath a second predetermined value to packet reducer 716.

The packet reducer 716 receives IDEPs 800 and processes the IDEPs 800 as frames of information. One function, among others, of the packet reducer 716 is to respond to congestion of IDEPs 800 in the buffers 718. Typically, when the buffer level of a given buffer has exceeds the glue threshold 720 the given buffer is considered to be congested, and then the packet reducer 716 relieves the congestion by replacing a frame of information having a particular bit size with another frame of information having a smaller bit size.

In the preferred embodiment, the packet reducer 716 employs a time division scheme for processing a IDEPs 800 for different buffers. Typically, the multiple buffers 718 are not all simultaneously congested, but the packet reducer 716 is adapted to handle all of the received IDEPs 800 even when all of the buffers 718 are simultaneously congested. In an alternative preferred embodiment, the NCR 710 includes multiple packet reducers, and each one of the packet reducers is associated with only one buffer. And in yet another preferred embodiment, the NCR 710 includes multiple packet reducers, and each of the packet reducers is associated with multiple buffers 718. In that case, each one of the packet reducers 716 is adapted to handle IDEPs streams for its associated buffers even if all of the associated buffers are simultaneously congested. The NCR 710 processes application frames 416 by frames of information. In other words, however the first application packet 416 of a frame of information is processed, all subsequent application packets 416 of that frame of information are processed in the same manner. Thus, for the sake of clarity, we shall describe what happens when the first application packet of a frame of information is processed. The content of the frame of information is modified at the application level, such that fewer network transport stream packets 602 need be transmitted.

Figure 9:
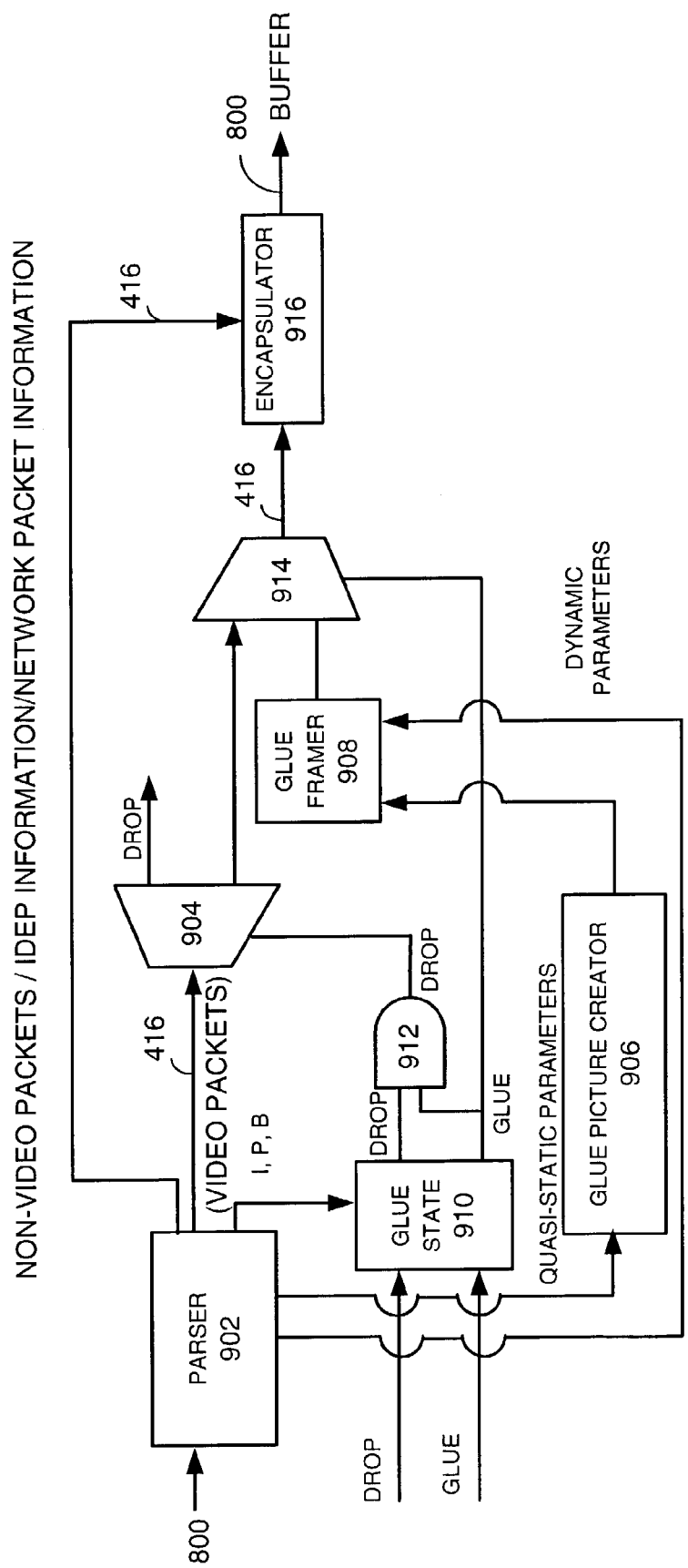
FIG. 9 is a block diagram of components of a packet reducer.

A non-limiting example of using application layer knowledge to modify contents of IDEPS 800 to alleviate network congestion is provided hereinbelow. Referring to FIG. 9, which illustrates some of the functional components of the NCR 710, a parser 902 receives IDEPs 800 from the demultiplexer 724, and removes the payload 606 therefrom. The parser 902 is adapted to use application logic in processing of the payload 606. The payload 606 includes multiple application packets 416, and the parser 902 uses the PAT 610 and the PMT 612 and the PID value of each of the application packets 416 to identify the content carried by the application packets 416.

The parser 902 directs application packets 416 that do not carry video information to an encapsulator 916. The parser 902 also sends the encapsulator 916 the associated IDEP information, which includes the header 802 and flags 806, and network packet information, such as header 604 and footer 608, for the received IDEPs 800.

Application packets 416 that carry video information are sent by the parser 902 to a demultiplexer 904. The parser 902 uses application logic to determine whether a given video application packet 416 is the first application packet 416 of a frame of information, and if so, determines whether the frame of information is an I, P, or B frame of information. The parser 902 sends a signal to a glue state machine 910 that signifies the type of information that is going to be processed. Specifically, the parser 902 signifies to the glue state machine 910 whether the frame of information is an I-picture 52, a B-picture 504 or a P-picture 506.

In addition, the parser 902 also reads the headers 418 of the application packets 416 to determine dynamic quantities such as PID values, stream ID's and other dynamic quantities and reads the application packet payload 420 to determine quasi-static parameters such as horizontal and vertical picture size. The parser 902 sends the quasi-static parameters to a "glue picture creator" 906 and the dynamic parameters are sent to a glue framer 908.

The glue state machine 910 monitors the status of the buffer level of the current buffer for which the NCR 710 is currently processing IDEPs 800 and determines whether the buffer level exceeds the predetermined glue threshold 720 or drop threshold 722. Using the buffer level, the glue state machine 910 determines whether to "glue" packets, "drop" packets, or do nothing. When the glue state machine 910 determines to glue or drop packets, it sends appropriate signals to gate 912 and to a multiplexer 914. The glue state machine 910 does not produce an output signal when it determines to do nothing.

Whenever gate 912 receives a drop signal or a glue signal, it sends a drop signal to the demultiplexer 904. In response to the drop signal, the demultiplexer 904 drops the video application packets 416 received from parser 902. The demultiplexer 904 continues to drop video application packets 416 until it no longer receives the drop signal. When the demultiplexer 904 does not receive a drop signal, the demultiplexer 904 sends video application packets 416 to the multiplexer 914.

The multiplexer 914 receives input from the demultiplexer 904, the glue framer 908, and the glue state machine 910. When the multiplexer 914 receives a glue signal, it no longer receives video application packets 416 from the demultiplexer 904 because they have been dropped. Instead the multiplexer 914 receives one or more video application packets 416 from the glue framer 908, which are then sent to encapsulator 916.

The glue picture creator 906 and the glue framer 908 combine to make MPEG application packets 416 that include MPEG coding for instructing a decoder to repeat the last displayed reference picture, i.e., the last displayed I-picture or P-picture. For the purposes of this disclosure, a "glue" picture is defined herein as the encoding for instructing a decoder to repeat the last reference frame of information. Such MPEG instructions include motion vectors that have a value of zero. Typically, it takes approximately two MPEG application packets 416 to encapsulate a glue picture. B-pictures, which are typically the smallest type of MPEG picture, are transported in approximately 20-70 MPEG packets. So by replacing a B-picture with a glue picture the bandwidth of the MPEG video is decreased. Thus, network congestion is alleviated by substituting glue pictures for an MPEG picture. The glue picture creator 906 generates the "glue" picture encoding using the received quasi-static parameters from the parser 902 and outputs the "glue" picture encoding to the glue framer 908 in MPEG format.

The glue framer 908 encapsulates the "glue" picture encoding in approximately two application packets 416. The glue framer 908 uses the dynamic parameters from the parser 902 for generating the application packet header 418.

In one preferred embodiment, the multiplexer 914 counts the number of application packets that it has processed and passed to the encapsulator 916. The multiplexer 914 includes application logic for writing the continuity counter in the processed video application packets 416.

The encapsulator 916 receives application packets 416 from the multiplexer 914 and from the parser 902. The encapsulator 916 uses the network information to encapsulate the application packets 416 in network packets 602. The encapsulator 916 then prepends the IDEP header 802 and flags 806 to the network packets 602 to make them into IDEPs 800, which are then passed to the buffer 718.

When necessary the video bandwidth can be further reduced by selectively dropping MPEG pictures and not substituting a glue picture for the dropped MPEG picture. In one embodiment, when the glue state machine 910 signals a drop, the demultiplexer 904 drops video application packets 416 that make up an MPEG picture, but the multiplexer 914 does not insert the application packets from the glue framer 908. Thus, the buffer 718 does not receive IDEPs 800 carrying video from the packet reducer 716 while the packet reducer 716 is in drop state. In another preferred embodiment, when the glue state machine 910 is in the drop state B and P pictures 504 and 506, respectively, are dropped from a GOP.

Figure 10:
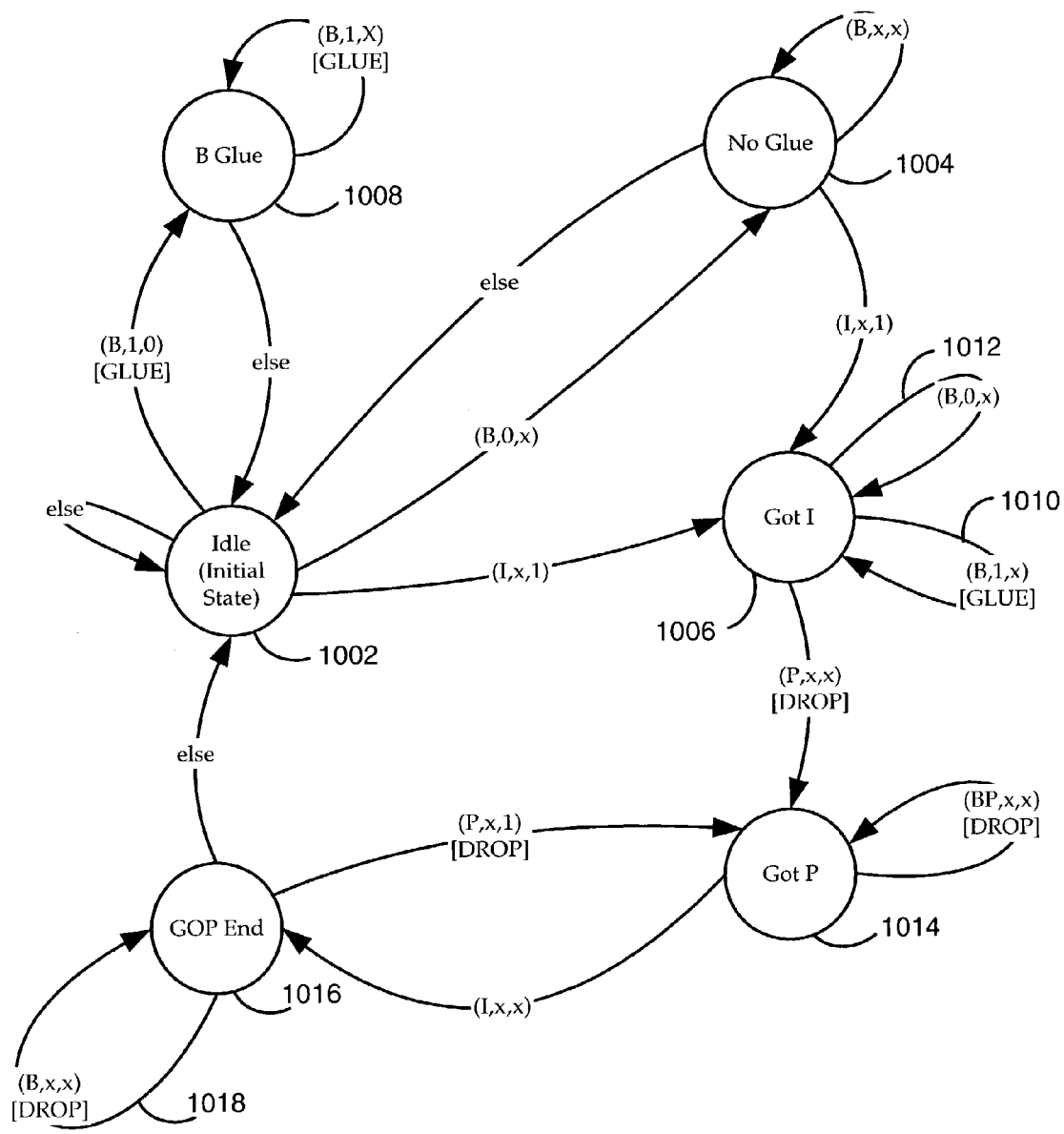
FIG. 10 is a diagram representing modes of a state machine.

Referring to FIG. 10, which illustrates exemplary logic implemented by glue state machine 910, there are six different operating modes for the glue state machine 910, and the different modes are determined by input signals from the parser 902 and from monitoring the buffer level in the associated buffer 718. The logic of the state machine 910 produces one of the following output conditions: normal condition, glue condition and drop condition. When the glue state machine 910 produces the normal condition, it does not activate any output signals. When the glue state machine 910 produces the glue condition or drop condition, it activates a glue signal or drop signal, respectively and in FIG. 10, the output signals are shown in the square brackets. The inputs for the various output conditions are given in Table 1.

TABLE 1

| Output Condition | Relevant Picture Types | "Glue" Output Signal State | "Drop" Output Signal State |
|---|---|---|---|
| Normal | I | 0 | 0 |
| Glue | B | 1 | 1 |
| Drop | P and B | 0 | 1 |

An I-picture 502 is the first MPEG picture in a GOP, and when the first application packet 416 of an I-picture 502 arrives at the parser 902, the parser 902 signals "I" until it receives the beginning of the next MPEG picture. The glue state machine 910 remains in a given state while it processes all of the application packets 416 that carry a given picture. It does not change states in the middle of processing a string of application packets that carry a picture.

Normal State

The state machine starts in "idle" mode 1002, and remains in that mode for as long as the picture type input is "I." Thus, the application packets 416 that carry an I-picture 502 are not dropped because there is no output from the state machine when it is in idle mode 1002.

When the parser 902 receives application packets 416 that carry a subsequent frame of information, it sends a new picture type signal to the glue state machine 910. Using the sequence of picture types from the previous example (IBBPBBP . . . ), the next picture is a B-picture, and the glue state machine 910 jumps to "no glue" mode 1004. It remains in this mode until it receives a different picture type input from the parser 902 e.g., an I or P input. From the "no glue" mode 1004, the glue state machine 910 can jump to either "GOT I" mode 1006 or back to idle mode 1002. In its normal state, the glue state machine 910 drops back to the idle state 1002. The "GOT I" mode 1006 is described in relation to "drop" state hereinbelow. Thus, as long as the glue state machine 910 is in its normal state, it transitions between "idle" mode 1002 and "no glue" mode 1004.

Glue State

When the glue state machine is in "glue" state, the level of the IDEPs 800 in the buffer 718 is between the "glue" threshold 720 and the "drop" threshold 722. The first time the buffer level in the buffer 718 transitions upwards beyond the glue threshold 720, the glue state machine 910 is either in "idle" 1002 or in "no glue" mode 1004. If it is in "no glue" mode 1004 it remains there until the picture input type changes, at which point, it reverts to "idle" mode 1002.

From "idle" mode 1002 the glue state machine 910 jumps to the "B glue" mode 1008, when the picture type input changes to "B" (and the buffer level is between the glue threshold 720 and drop threshold 722). As long as the picture type input remains "B" and the buffer level exceeds the glue threshold 720, the glue state machine 910 remains in "B glue" mode 1008. However, if the buffer level drops below the glue threshold 720, the glue state machine 910 remains in the B glue mode 1008 until it has finished processing the application packets 416 that carry the current B-picture 504 frame of information and then it drops to the idle mode 1002. However, once the picture input type changes to "I" or "P", signifying that the parser 902 has received application packets 416 of a frame of information for a different picture type, the glue state machine 910, reverts back to the idle mode 1002 regardless of the buffer level in buffer 718. While the glue state machine 910 is in the glue state, it outputs a "glue" signal.

Drop State

The final type of state of the glue state machine 910 is the "drop" state, which occurs when the buffer level in the buffer 718 exceeds the drop threshold 722. In the "drop" state all of the P-pictures and B-pictures in a GOP are dropped. The glue state machine 910 remains in its current mode, either idle mode 1002, no B glue mode 1004, or B glue mode 1006 until the picture type input is an I and the buffer level in the buffer 718 exceeds the drop threshold 722. At which point, the glue state machine 910 transitions to the "GOT I" mode 1006. In this embodiment, I-pictures are not dropped, and therefore, there is no output from the glue state machine 1008 when it is in the "GOT I" mode 1006 and the picture type is I. After the I-picture, the next picture transmitted is a B-picture of the prior GOP. If the value of the buffer level of the buffer 718 still exceeds the glue threshold 720, then in loop 1010 the output of the glue state machine 910 is "glue". On the other hand, if the value of the buffer level of the buffer 718 has dropped below the glue threshold 720, then in loop 1012 the output of the glue state machine 910 is nothing and the B-picture is not dropped.

When the picture type input changes to P and the value of the buffer level of the buffer 718 still exceeds the drop threshold 722, the glue state machine 910 jumps to the "GOT P" mode 1014, and its output is "drop". It remains in "GOT P" mode 1014 outputting "drop" until the picture type changes to I, at which point, it jumps to "GOP end" mode 1016.

When a GOP ends in a B-picture, the B-picture is transmitted after the I-picture of the next GOP. Thus, in loop 1018 the final B-pictures of the GOP being dropped are dropped.

On the other hand, if the final picture of the GOP being dropped is a P-picture, then all of the B and P pictures of that GOP were dropped during the "GOT P" 1014.

The glue state machine 910 remains in the "GOP end" mode 1016 until the picture type input changes to P. If the buffer level in buffer 718 is still above the drop threshold 722, the glue state machine 910 reverts back "GOT P" mode 1014, otherwise it reverts to "idle" mode 1002.

Figure 11:
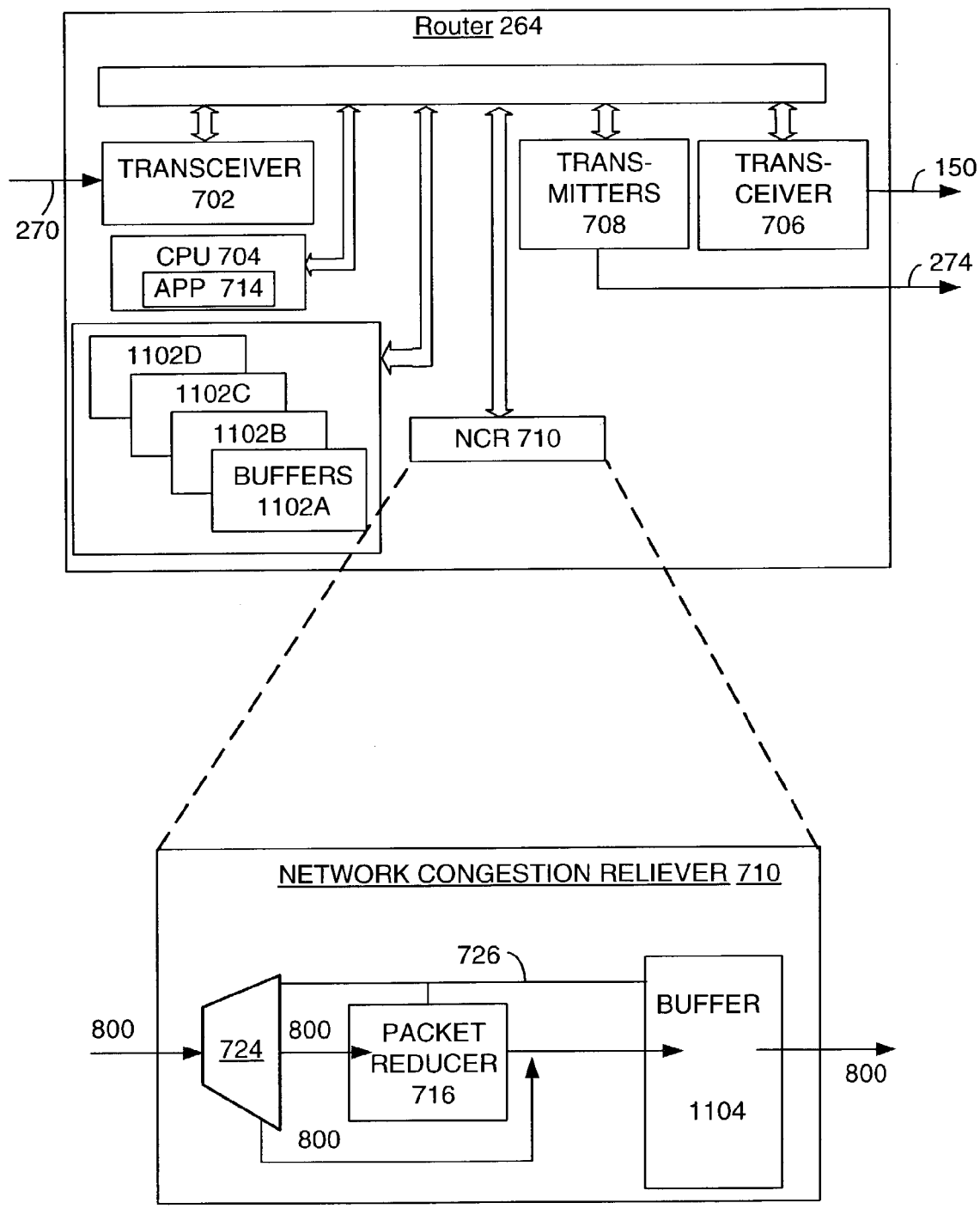
FIG. 11 is a block diagram of a router.

Referring to FIG. 11, in another embodiment the router 264 includes a set of input buffers 1102A-1102D, which buffers IDEPs 800 from the CPU 704. The NCR 710 includes an output buffer 1104, which receives IDEPs 800 from the packet reducer 716. In this embodiment, each buffer 1102A-1102D receives and buffers IDEPs 800 that carry a portion of a program that can be modified to relieve network congestion, and each of the buffers 1102A-1102D is a FIFO buffer of sufficient size to buffer at least one frame of information.

The packet reducer 716 monitors the buffer level of the buffers 1102A-1102D and 1104 and processes IDEPs 800 buffered in the buffers 1102A-1102D using a time division multiplexing scheme and is adapted to calculate the bit size of the frames of information buffered therein. When the buffer level of buffer 1104 exceeds the glue threshold 720 and the packet reducer 716 is currently processing IDEPs 800 from a given buffer such as buffer 1102A, the packet reducer 716 calculates the bit size of the current first-in frame of information in buffer 1102A and sends a glue frame of information to the buffer 1104 instead of the current first-in frame of information. Typically, the packet reducer 716 will start processing IDEPs 800 from one of the other buffers 1102B-1102D such as buffer 1102B before it is finished processing the IDEPs 800 of the current first-in frame of information from buffer 1102A. In that case, packet reducer 716 calculates the bit size of the current first-in frame of information of buffer 1102B and determines whether to modify the current first-in frame of information from buffer 1102B by considering the current buffer level of buffer 1104 and the bit sizes of the current first-in frames of information from buffers 1102A and 1102B. The packet reducer 716 estimates the projected buffer level of buffer 718 after the current first-in frame of information of buffer 1102A has been replaced with a glue frame of information and using the projected buffer level determines whether to modify the current first-in frame of information in buffer 1102B.

Although exemplary preferred embodiments of the present invention have been shown and described, it will be apparent to those of ordinary skill in the art that a number of changes, modifications, or alterations to the invention as described may be made, none of which depart from the spirit of the present invention. It should be remembered that router 264 is a non-limiting example of a device adapted to have application awareness and that other components of the headend can also be similarly adapted. Changes, modifications, and alterations should therefore be seen as within the scope of the present invention. It should also be emphasized that the above-described embodiments of the present invention, particularly, any "preferred embodiments" are merely possible non-limiting examples of implementations, merely setting forth a clear understanding of the principles of the inventions.

What is claimed is:

1. An apparatus for relieving network packet congestion, the apparatus comprising:

an input port for receiving a stream of network packets, each network packet formatted according to a first protocol and having at least one application packet formatted according to a second protocol included therein, wherein the at least one application packet includes a content having at least a portion of a frame of information; and a packet reducer in communication with the input port for modifying the received stream of network packets, wherein the packet reducer dynamically implements a processing scheme of a plurality of processing schemes for the received stream of network packets, wherein at least one of the processing schemes is a scheme for examining each network packet of the stream of network packets and determining for each network packet of the stream of network packets whether to process that network packet of the stream of network packets using information from the at least one application packet of the given network packet, wherein each network packet of the stream of network packets is encapsulated within a respective internal device packet that is generated within the apparatus and which comprises a given network packet, an internal device packet header and a plurality of flags indicative of at least a selected buffer to which the internal device packet should be sent within the apparatus and a program priority level of the internal device packet, wherein the packet reducer monitors the selected buffer in the apparatus that buffers packets to determine a buffer level for the selected buffer, and responsive to the buffer level being above a first threshold in the selected buffer, replaces at least one network packet that carries the portion of the frame of information with a second network packet carrying a new frame of information, wherein the at least one network packet has a first bit size and the second network packet has a second bit size that is smaller than the first bit size; and responsive to the buffer level being above a second threshold in the selected buffer, drops the application packet that make up the frame of information, wherein the frame of information is not included in an output of the packet reducer.

2. The apparatus of claim 1, wherein the first protocol is the Ethernet protocol.

3. The apparatus of claim 1, wherein the second protocol is the MPEG protocol.

4. The apparatus of claim 1, further including:
a transmitter in communication with the packet reducer adapted to transmit a second stream of network packets, wherein the packet reducer processes the first stream of network packets to produce the second stream of network packets.

5. The apparatus of claim 4, wherein each network packet of the second stream of packets conforms to a third protocol and includes a content having at least one application packet formatted according to the second protocol.

6. The apparatus of claim 4, wherein the transmitter is a QAM modulator.

7. The apparatus of claim 5, wherein the second stream of network packets defines at least one stream of frames of information, wherein the frames of the at least one stream of information are MPEG frames.

8. The apparatus of claim 7, wherein the MPEG frames include video frames.

9. The apparatus of claim 7, wherein the MPEG frames include audio frames.

10. The apparatus of claim 4, wherein the first stream of network packets sequentially carries a first, a second, and a third frame of information, and the second stream of network packets sequentially carries the first frame of information, a fourth frame of information, and the third frame of information.

11. The apparatus of claim 4, wherein the first stream of network packets sequentially carries a first, a second, and a third frame of information, and the second stream of network packets sequentially carries the first frame of information and the third frame of information.

12. An apparatus for relieving network packet congestion, the apparatus comprising:
an input port for receiving a stream of frames of information, wherein the stream of frames is made up of multiple frames of information, and each frame of information is received in at least one network packet conforming to a first protocol and includes a content having at least one application packet formatted according to a second protocol; and a packet reducer adapted to modify the received stream of frames, wherein the packet reducer dynamically implements a processing scheme of a plurality of processing schemes for examining each frame of information from the stream of frames and determining for each frame of information of the stream of frames, whether to modify each frame of information of the stream of frames using information from the at least one application packet of the selected frame responsive to packet congestion, wherein each frame of the stream of frames is encapsulated within a respective internal device packet that is generated within the apparatus and which comprises a given received frame, an internal device packet header and a plurality of flags indicative of at least a selected buffer to which the internal device packet should be sent within the apparatus and a program priority level of the internal device packet, wherein the packet reducer checks the selected buffer to determine a buffer level in the selected buffer and determines packet congestion usinci the buffer level of the selected buffer, wherein responsive to the buffer level being above a first threshold in the selected buffer, the packet reducer replaces the at least one network packet with a second at least one network packet, wherein the first at least one network packet has a first bit size and the second at least one network packet has a second bit size that is smaller than the first bit size; and wherein responsive to the buffer level being above a second threshold in the selected buffer, the packet reducer drops the at least one application packet.

13. The apparatus of claim 12, wherein the selected buffer sends a signal related to packet congestion to the packet reducer responsive to packets buffered therein exceeding a given threshold.

14. The apparatus of claim 12, wherein
a transmitter in communication with the selected buffer is adapted to transmit a second stream of frames, wherein the second stream of frames is made up of multiple frames, and each frame of the second stream of frames is transmitted in at least one network packet conforming to a third protocol and includes a content having at least one application packet formatted according to the second protocol, wherein the packet reducer receives the network packets of the first stream of frames and outputs the network packets of the second stream of frames to the selected buffer.

15. The apparatus of claim 14, wherein the first protocol is an Ethernet protocol.

16. The apparatus of claim 14, wherein the second protocol is an MPEG protocol.

17. The apparatus of claim 14, wherein the third protocol is an Ethernet protocol.

18. The apparatus of claim 14, wherein the third protocol is an DVB ASI protocol.

19. The apparatus of claim 12, wherein a given frame of the received stream of frames of information is made up of multiple network packets in a sequence, and the packet reducer is adapted to receive a first network packet that includes at least one application packet formatted according to the second protocol and determine whether the first network packet is the first network packet of the sequence.

20. An apparatus for relieving network packet congestion, the apparatus comprising:
an input port for receiving a first stream of network packets, each network packet formatted according to a first protocol and having at least one application packet formatted according to a second protocol included therein, wherein the at least one application packet includes a content having at least a portion of a frame of information; and
a packet reducer in communication with the input port adapted to receive the first stream of network packets, to examine each packet of a selected set of network packets, to individually determine a compression level for each packet of the selected set of network packets from the first stream of network packets, compress a plurality of the packets of the selected set of network packets, and output a second stream of network packets, wherein the set of network packets carry a frame of information, and the second stream of network packets includes the non-selected network packets of the first stream of network packets; and
a transmitter in communication with the network packet reducer adapted to receive and transmit the second stream of network packets,
wherein each network packet of the stream of network packets is encapsulated within a respective internal device packet that is generated within the apparatus and which comprises a given network packet, an internal device packet header and a plurality of flags indicative of at least a selected buffer to which the internal device packet should be sent within the apparatus and a program priority level of the internal device packet,
wherein the packet reducer monitors the selected buffer that buffers packets to determine a buffer level for the selected buffer,
wherein, responsive to the buffer level being above a first threshold in the selected buffer, the packet reducer replaces a first network packet that carries a portion of a given frame of information with a second network packet carrying a new frame of information, wherein the first network packet has a first bit size and the second network packet has a second bit size that is smaller than the first bit size; and
wherein, responsive to the buffer level being above a second threshold in the selected buffer, the packet reducer drops application packets that make up the given frame of information, wherein the given frame of information is not included in the second stream of frames of information.

21. The apparatus of claim 20, wherein the packet reducer selects a set of network packets when the buffer level exceeds a threshold, the set of network packets include a first set of application packets carrying a first frame of information, and the packet reducer replaces the first set of application packets with a second set of application packets carrying a second frame of information and encapsulates the second set of application packets in a second set of network packets, and wherein the selected set of network packets have an aggregate first bit size and the second set of network packets have a second aggregate bit size that is smaller than the first aggregate bit size, and the transmitter transmits the second set of network packets.

22. The apparatus of claim 21, wherein the frame of information carried by the first set of network packets is an MPEG B-picture and the second set of network packets carry a glue frame of information.

23. The apparatus of claim 20, wherein the network packets of the second stream of network packets are formatted according to a third protocol and the network packets of the second stream of network packets have at least one application packet formatted according to the second protocol, wherein the at least one application packet includes a content having at least a portion of a frame of information.

24. The apparatus of claim 23, wherein the first protocol is an Ethernet protocol.

25. The apparatus of claim 23, wherein the second protocol is an MPEG protocol.

26. The apparatus of claim 23, wherein the third protocol is an Ethernet protocol.

27. A method for processing packets in an apparatus, the method comprising the steps of:
receiving a first stream of frames of information at the apparatus, wherein the first stream of frames of information is made up of multiple frames of information including a given frame of information;
encapsulating each frame of information in a respective internal device packet which comprises the given frame of information, an internal device packet header and a plurality of flags indicative of at least a selected buffer to which the internal device packet should be sent and a program priority level of the internal device packet;
examining each frame of information;
determining for each individual frame of information whether to modify that individual frame of information, wherein the given frame of information is carried in at least one network packet, which is formatted according to a first protocol, having a first content of at least one application packet, which is formatted according to a second protocol, wherein the at least one application packet includes a second content that carries at least a portion of the given frame of information;
responsive to determining to modify each frame of information, modifying the information of the frame, wherein a plurality of frames of information are modified; and
transmitting a second stream of frames of information, wherein the second stream of frames of information includes unmodified frames of the first stream of frames of information, and frames of the second stream of frames of information are carried in at least one network packet, which is formatted according to a third protocol, having a third content of at least one application packet, which is formatted according to the second protocol, wherein the at least one application packet includes the second content that carries at least a portion of the given frame of information,
wherein the step of determining whether to modify the given frame of information further includes the step of:
monitoring the selected buffer in the apparatus that buffers packets to determine a buffer level for the selected buffer; and
wherein the step of modifyinci the given frame of information further includes the steps of:
responsive to the buffer level being above a first threshold in the selected buffer:
replacing the at least one network packet that carries a portion of the given frame of information with a second at least one network packet carrying new frame of information, wherein the first at least one network packet has a first bit size and the second at least one network packet has a second bit size that is smaller than the first bit size; and transmitting the new frame of information in the second stream of frames of information; and responsive to the buffer level being above a second threshold in the selected buffer, dropping the application packets that make up the given frame of information, wherein the given frame of information is not included in the second stream of frames of information.

28. The method of claim 27, wherein the given frame of information is an MPEG B-picture, and the new frame of information is an MPEG picture having motion vectors with zero value.

29. The method of claim 27, further including the steps of:

receiving at least a third stream of frames of information, wherein the third stream of frames of information is made up of multiple frames of information including a second given frame;

determining whether to modifij the second given frame of information, wherein the second given frame of information is made up of a second at least one network packet that is formatted according to a third protocol and includes a third content of a second at least one application packet that is formatted according to a fourth protocol, wherein the second at least one application packet includes a fourth content that is at least a portion of the second given frame of information;

responsive to determining to modify the second given frame of information, modifying the second given frame of information; and transmitting a fourth stream of frames of information, wherein the fourth stream of frames of information includes unmodified frames of the third stream of frames of information.

30. The method of claim 29, wherein the step of determining whether to modify the second given frame of information further includes the steps of:

determining a network buffer level for all the selected buffer in the apparatus, wherein the selected buffer buffers unmodified frames of information of the first and third streams of frames;

receiving frame modification information related to modification of the first given frame of information, wherein both the frame modification information and the buffer level are used in determining whether to modify the second given frame of information.

* * * * *